(12) United States Patent
Wenning et al.

(10) Patent No.: US 11,311,960 B2
(45) Date of Patent: Apr. 26, 2022

(54) HIGH-EFFICIENCY WELDING ASSEMBLY FOR USE IN ULTRASONIC ADDITIVE MANUFACTURING

(71) Applicant: FABRISONIC LLC, Columbus, OH (US)

(72) Inventors: Justin Wenning, Columbus, OH (US); Adam J. Hehr, Columbus, OH (US); Mark I. Norfolk, Powell, OH (US)

(*) Notice: Subject to any disclaimer, the term of this patent is extended or adjusted under 35 U.S.C. 154(b) by 36 days.

(21) Appl. No.: 16/989,110

(22) Filed: Aug. 10, 2020

(65) Prior Publication Data
US 2022/0040784 A1  Feb. 10, 2022

(51) Int. Cl.
B23K 20/00 (2006.01)
B23K 20/10 (2006.01)

(52) U.S. Cl.
CPC .................... B23K 20/106 (2013.01)

(58) Field of Classification Search
CPC .... B23K 20/106; B23K 20/10; B23K 20/103; B23K 37/04; H01L 2224/85205
See application file for complete search history.

(56) References Cited

U.S. PATENT DOCUMENTS

| | | | | |
|---|---|---|---|---|
| 5,772,100 A | * | 6/1998 | Patrikios | B06B 3/00 228/1.1 |
| 8,082,966 B2 | * | 12/2011 | Short | B23K 20/106 156/580.2 |
| 9,346,120 B1 | * | 5/2016 | Graff | B23K 20/103 |

* cited by examiner

Primary Examiner — Erin B Saad

(57) ABSTRACT

An ultrasonic welding assembly comprising a sonotrode having a first body portion, a first nodal region, a welding region, a second nodal region, and a second body portion; a transducer rotationally connected to the second body portion for transmitting acoustic vibrations to the welding region; a roller device connected to the transducer and sonotrode for permitting axial rotation of the transducer and sonotrode; a support device flexibly connected to the roller device for maintaining axial alignment of the transducer and sonotrode relative to a target welding area; a mount for supporting the sonotrode; and four frictionless bearings positioned around the nodal regions of the sonotrode, wherein the frictionless bearings are attached to the mount.

5 Claims, 7 Drawing Sheets

HIGH-EFFICIENCY WELDING ASSEMBLY FOR USE IN ULTRASONIC ADDITIVE MANUFACTURING

BACKGROUND

The disclosed inventive subject matter relates in general to ultrasonic welding systems and more specifically to a high-efficiency welding system and device for use in various ultrasonic additive manufacturing applications.

Ultrasonic welding is an industrial process involving high-frequency ultrasonic acoustic vibrations that are locally applied to workpieces being held together under pressure to create a solid-state weld. This process has applications in the electrical/electronic, automotive, aerospace, appliance, and medical industries and is commonly used for plastics and especially for joining dissimilar materials. Ultrasonic welding of thermoplastics results in local melting of the plastic due to absorption of vibration energy. The vibrations are introduced across the joint to be welded. In metals, ultrasonic welding occurs due to high-pressure dispersion of surface oxides and local motion of the materials. Although there is heating, it is not sufficient to melt the base materials. Vibrations are introduced along the joint being welded.

Ultrasonic welding systems may include the following components: (i) a press to apply pressure to the two parts to be assembled under pressure; (ii) a nest or anvil where the parts are placed for allowing high frequency vibration to be directed to the interfaces of the parts; (iii) an ultrasonic stack that includes a converter or piezoelectric transducer for converting the electrical signal into a mechanical vibration, an optional booster for modifying the amplitude of the vibration (it is also used in standard systems to clamp the stack in the press), and a sonotrode or horn for applying the mechanical vibration to the parts to be welded (note: all three components of the stack are specifically tuned to resonate at the same exact ultrasonic frequency which is typically 20 kHz); (iv) an electronic ultrasonic generator or power supply delivering a high power AC signal with frequency matching the resonance frequency of the stack; and (v) a controller for controlling the movement of the press and the delivery of the ultrasonic energy.

Ultrasonic additive manufacturing (UAM) is an additive manufacturing technique that typically includes the use of: (i) high-frequency (e.g., >20 kHz) to merge layers of metal drawn from featureless foil stock; and (ii) computer numerically controlled (CNC) contour milling to create various specific features within the layers of metal. The ultrasonic welding of metal foils may be characterized as an additive aspect of the UAM process, while computer numerically controlled (CNC) contour milling may be characterized as a subtractive aspect of the UAM process. During the UAM process, high-frequency (e.g., 20 kHz) ultrasonic vibrations are locally applied to metal foils, which are held together under pressure, to create a solid-state weld. CNC contour milling is then used to create desired geometric features within a given layer. This process is then repeated until a solid component has been created or a feature is repaired within or added to a component. UAM can join dissimilar metal materials of different thicknesses and permit fiber materials to be embedded in solid metal matrices at relatively low temperature (typically <50% of the metal matrix melting temperature) and pressure. The UAM process produces true metallurgical bonds with full density and is effective with a variety of metals such as aluminum, copper, stainless steel, and titanium. By combining additive and subtractive process capabilities, UAM can be used to create deep slotted, hollow, latticed, or honeycombed internal structures within UAM components, and other complex geometries that cannot be created with conventional subtractive manufacturing processes.

Full-scale 20 kHz UAM technology is relatively mature and flexible with regard to the use thereof for different purposes. Commercially available UAM systems are currently used for welding dissimilar materials (e.g., for radiation shielding applications), providing selective reinforcement in UAM components, embedding sensors in UAM components, creating complex internal cooling channels in UAM components, and various combinations of these capabilities. The 20 kHz UAM welding assembly disclosed in U.S. Pat. No. 8,272,424, which is incorporated by reference herein in its entirety and for all purposes, provides numerous advantages including: (i) the application of compressive forces to the sonotrode at the nodal regions thereof, thereby permitting greater overall delivery of force to workpieces; (ii) the inclusion of two transducers in a push-pull configuration that permits higher power to be delivered to the workpieces; and (iii) a unique arrangement of springs and linear guides that provide axial alignment of ultrasonic components, the ability for the ultrasonic components to spin about the central axis thereof, lateral flexibility for vibrations in the ultrasonic components, and lateral stiffness for lateral alignment of the welding head.

Despite being highly effective for its intended purpose, the 20 kHz UAM welding assembly disclosed in U.S. Pat. No. 8,272,424 is not suitable for a significant number of applications for the following reasons: (i) the 20 kHz welding assembly is more than 24 inches long, which limits accessibility of the welding head; (ii) the 20 kHz welding head requires more than 1000 pounds of load for creating a satisfactory metal to metal weld, thereby requiring associated UAM equipment to be large, heavy, and bulky; and (iii) the 20 kHz welding head is rated at 10,000 W of power, which permits high deposition; however, this very high power draw is not practical for off-grid or remote applications. Accordingly, there is an ongoing need for high-efficiency UAM welding system and assembly that does not suffer from the aforementioned limitations.

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

One implementation provides a first ultrasonic welding assembly. This ultrasonic welding assembly comprises a sonotrode that further includes a first body portion, a first nodal region immediately adjacent to the first body portion, a welding region immediately adjacent to the first nodal region, a second nodal region immediately adjacent to the welding region, and a second body portion immediately adjacent to the second nodal region; a transducer rotationally connected to the second body portion of the sonotrode for transmitting acoustic vibrations to the welding region; a roller device connected to the transducer and sonotrode for permitting axial rotation of the transducer and sonotrode; a support device flexibly connected to the roller device for maintaining axial alignment of the transducer and sonotrode relative to a target welding area; a mount for supporting the sonotrode; a first frictionless bearing assembly positioned around the first nodal region of the sonotrode, wherein the first frictionless bearing assembly includes an upper housing portion connected to the mount; a first frictionless bearing disposed within the upper housing portion, wherein the first frictionless bearing is in contact with the first nodal region of the sonotrode; a lower housing portion connected to the upper housing portion; and a second frictionless bearing disposed within the lower housing portion, wherein the second frictionless bearing is in contact with the first nodal region of the sonotrode; and a second frictionless bearing assembly positioned around the second nodal region of the sonotrode, wherein the second frictionless bearing assembly includes an upper housing portion connected to the mount; a third frictionless bearing disposed within the upper housing portion, wherein the third frictionless bearing is in contact with the second nodal region of the sonotrode; a lower housing portion connected to the upper housing portion; and a fourth frictionless bearing disposed within the lower housing portion, wherein the fourth frictionless bearing is in contact with the second nodal region of the sonotrode. The ultrasonic welding assembly may further comprise a second transducer connected to the first body portion of the sonotrode and a threaded connector for connecting the transducer to the sonotrode. The transducer and sonotrode may rotate axially in unison, the welding assembly may operate at an ultrasonic frequency of 20-50 kHz, the welding region of the sonotrode may be textured, and the mount may further include a force application region. The roller device may further include a retaining ring, a floating roller bearing, a diaphragm spring mount, a diaphragm spring, and a spring clamp plate. The support device may further include a support ring that houses the floating roller bearing, wherein the support ring includes first and second linear guides mounted thereon, and wherein the first and second linear guides flexibly engage first and second linear rails connected to the mount.

Another implementation provides a second ultrasonic welding assembly. This ultrasonic welding assembly comprises a sonotrode, that further includes a first body portion, a first nodal region immediately adjacent to the first body portion, a welding region immediately adjacent to the first nodal region, a second nodal region immediately adjacent to the welding region, and a second body portion immediately adjacent to the second nodal region; at least one transducer rotationally connected to the second body portion of the sonotrode for transmitting acoustic vibrations to the welding region; a roller device connected to the at least one transducer and sonotrode for permitting axial rotation of the transducer and sonotrode; a support device flexibly connected to the roller device for maintaining axial alignment of the transducer and sonotrode relative to a target welding area; a mount for supporting the sonotrode, wherein the mount further includes a force application region; a first frictionless bearing assembly positioned around the first nodal region of the sonotrode, wherein the first frictionless bearing assembly includes an upper housing portion connected to the mount; a first frictionless bearing disposed within the upper housing portion, wherein the first frictionless bearing is in contact with the first nodal region of the sonotrode; a lower housing portion connected to the upper housing portion; and a second frictionless bearing disposed within the lower housing portion, wherein the second frictionless bearing is in contact with the first nodal region of the sonotrode; and a second frictionless bearing assembly positioned around the second nodal region of the sonotrode, wherein the second frictionless bearing assembly includes an upper housing portion connected to the mount; a third frictionless bearing disposed within the upper housing portion, wherein the third frictionless bearing is in contact with the second nodal region of the sonotrode; a lower housing portion connected to the upper housing portion; and a fourth frictionless bearing disposed within the lower housing portion, wherein the fourth frictionless bearing is in contact with the second nodal region of the sonotrode; and wherein the welding assembly operates at an ultrasonic frequency of 20-50 kHz. The transducer and sonotrode rotate axially in unison. The ultrasonic welding assembly may further comprise a threaded connector for connecting the transducer to the sonotrode. The welding region of the sonotrode may be textured. The roller device may further include a retaining ring, a floating roller bearing, a diaphragm spring mount, a diaphragm spring, and a spring clamp plate. The support device may further include a support ring that houses the floating roller bearing, wherein the support ring includes first and second linear guides mounted thereon, and wherein the first and second linear guides flexibly engage first and second linear rails connected to the mount.

Still another implementation provides a third ultrasonic welding assembly. This ultrasonic welding assembly comprises a rotating sonotrode that further includes a first body portion, a first nodal region immediately adjacent to the first body portion, a welding region immediately adjacent to the first nodal region, a second nodal region immediately adjacent to the welding region, and a second body portion immediately adjacent to the second nodal region; a mount for supporting the sonotrode; at least one transducer rotationally connected to the second body portion of the sonotrode for transmitting acoustic vibrations to the welding region; a roller device connected to the at least one transducer and sonotrode for permitting axial rotation of the transducer and sonotrode, wherein the roller device further includes a retaining ring, a floating roller bearing, a diaphragm spring mount, a diaphragm spring, and a spring clamp plate; a support device flexibly connected to the roller device for maintaining axial alignment of the transducer and sonotrode relative to a target welding area, wherein the support device further includes a support ring that houses the floating roller bearing, wherein the support ring includes first and second linear guides mounted thereon, and wherein the first and second linear guides flexibly engage first and second linear rails connected to the mount; a first frictionless bearing disposed within the upper housing portion, wherein the first frictionless bearing is in contact with the first nodal region of the sonotrode; a lower housing portion connected to the upper housing portion; and a second frictionless bearing disposed within the lower housing portion, wherein the second frictionless bearing is in contact with the first nodal region of the sonotrode; and a second frictionless bearing assembly positioned around the second nodal region of the sonotrode, wherein the second frictionless bearing assembly includes an upper housing portion connected to the mount; a third frictionless bearing disposed within the upper housing portion, wherein the third frictionless bearing is in contact with the second nodal region of the sonotrode; a lower housing portion connected to the upper housing portion; and a fourth frictionless bearing disposed within the lower housing portion, wherein the fourth frictionless bearing is in contact with the second nodal region of the sonotrode; and wherein the welding assembly operates at an ultrasonic frequency of about 20-50 kHz. The mount may further include a force application region. The transducer and sonotrode may rotate axially in unison. The ultrasonic welding assembly may further comprise a threaded connector for connecting the transducer to the sonotrode and the welding region of the sonotrode may be textured.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein.

DETAILED DESCRIPTION

Figure 1:
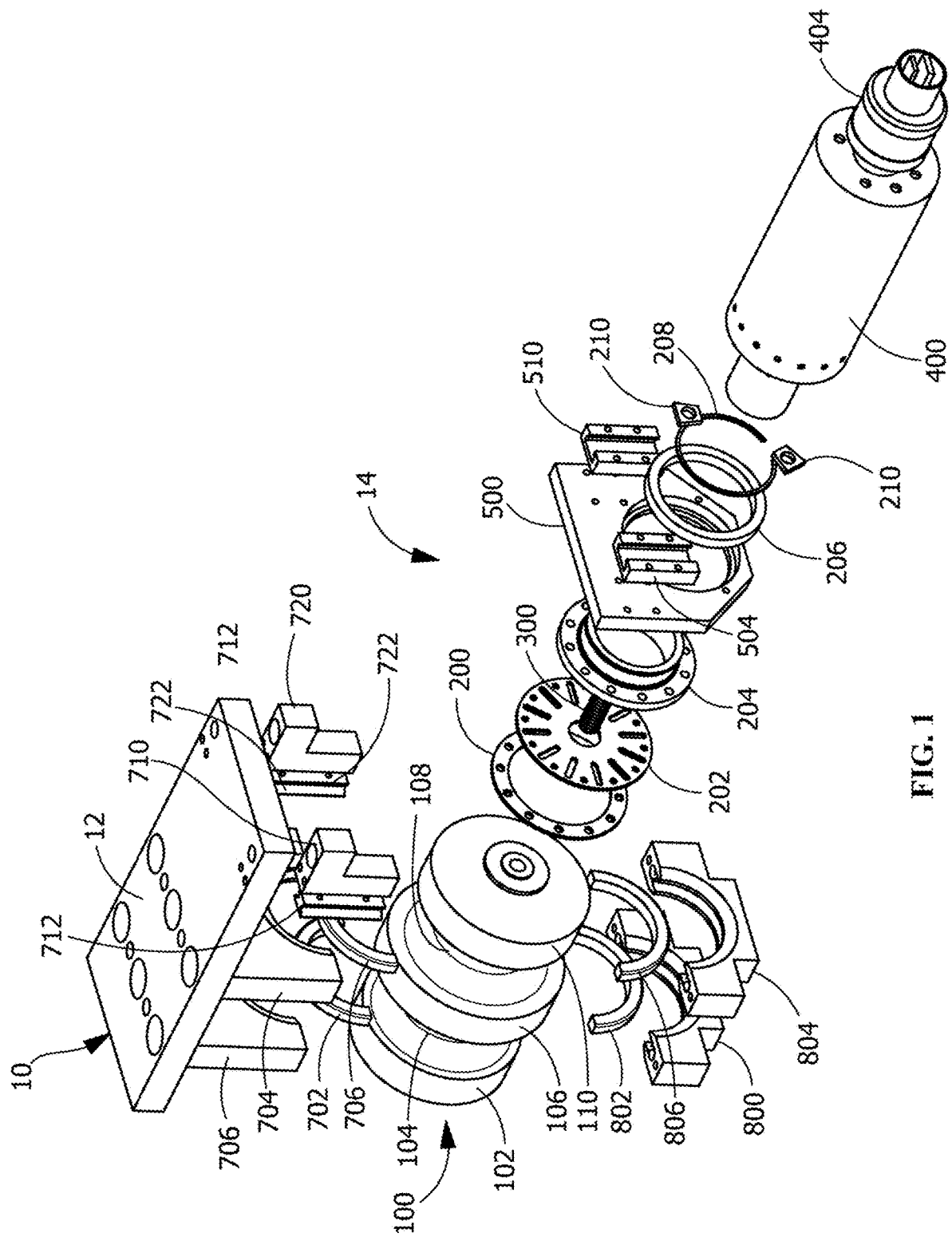
FIG. 1 is an exploded perspective view of a first example implementation of a high-efficiency welding assembly for use in ultrasonic additive manufacturing processes.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

Implementations of the disclosed welding assembly enable high power densities in ultrasonic metal welding roll welding systems. This technology may be utilized for the high-power ultrasonic welding of metal foils and for additive manufacturing. Various implementations of the disclosed welding assembly are scaled-down relative to prior art welding assemblies such as the assembly disclosed in U.S. Pat. No. 8,082,966 and provide reduced power consumption and smaller physical size. These modifications permit the disclosed welding assembly to be used in off-grid environments where power is provided locally. Such environments may include space-based environments (e.g., the International Space Station) or forward deployed military environments (e.g., naval ships). The lower power consumption of the disclosed welding assembly permits the system to use battery power rather than fixed shore power. The smaller physical size permits the system to be portable, wherein standard or traditional UAM systems are weighed in tons because the high load aspects of such systems require robust motion systems.

Figure 2:
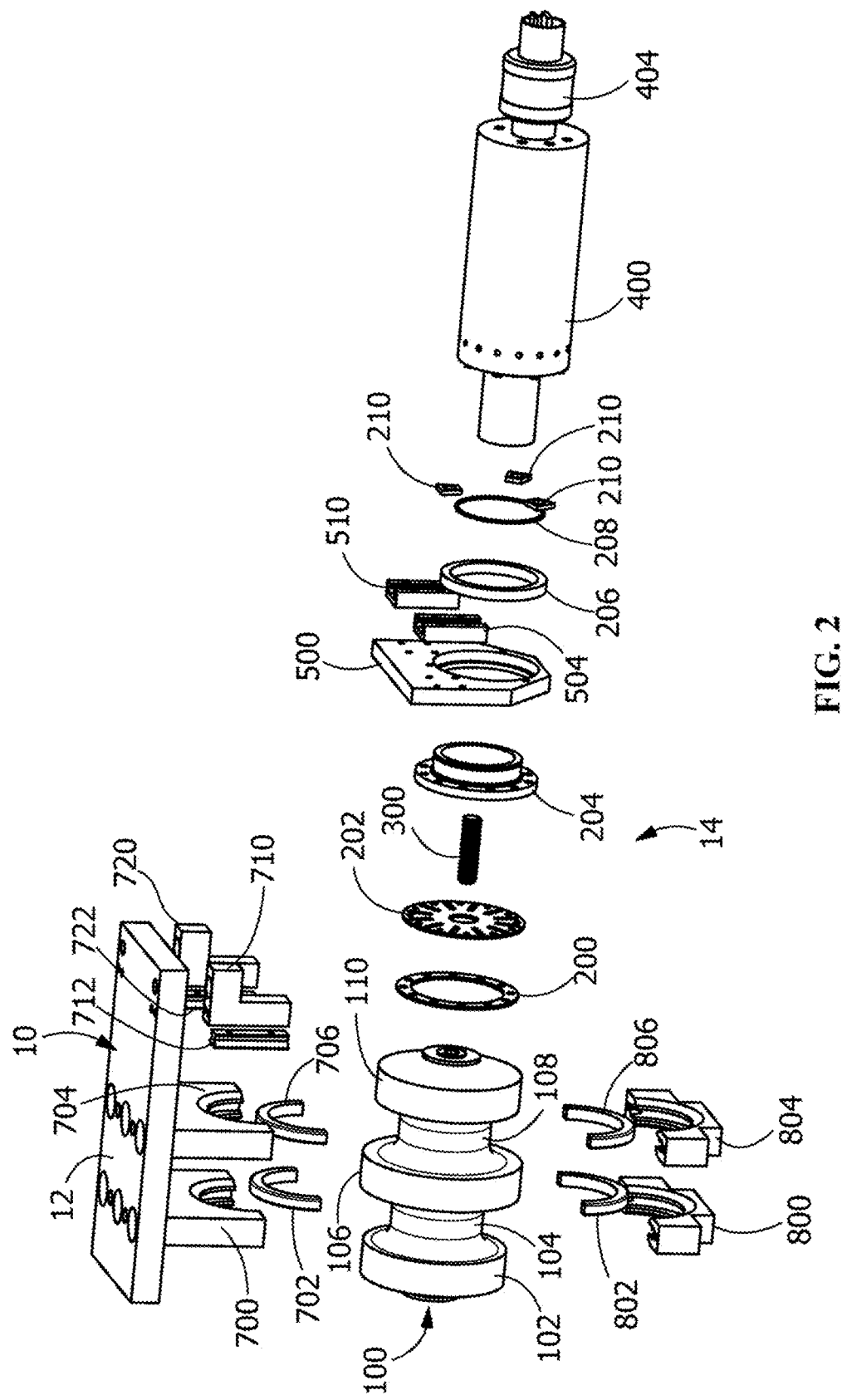
FIG. 2 is an exploded side view of the high-efficiency welding assembly of FIG. 1.
Figure 3:
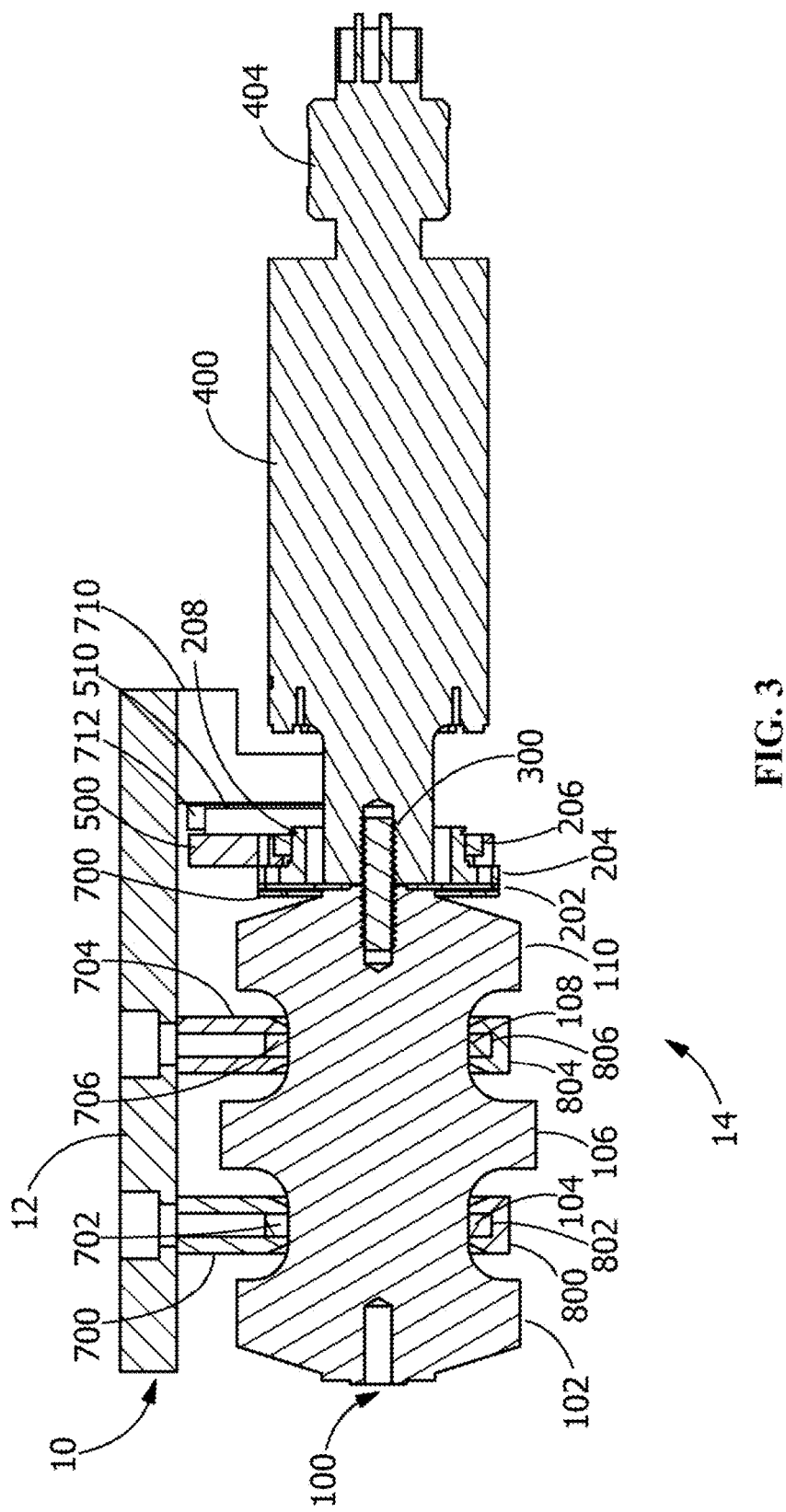
FIG. 3 is an assembled cross-sectional side view of the high-efficiency welding assembly of FIG. 1.
Figure 4:
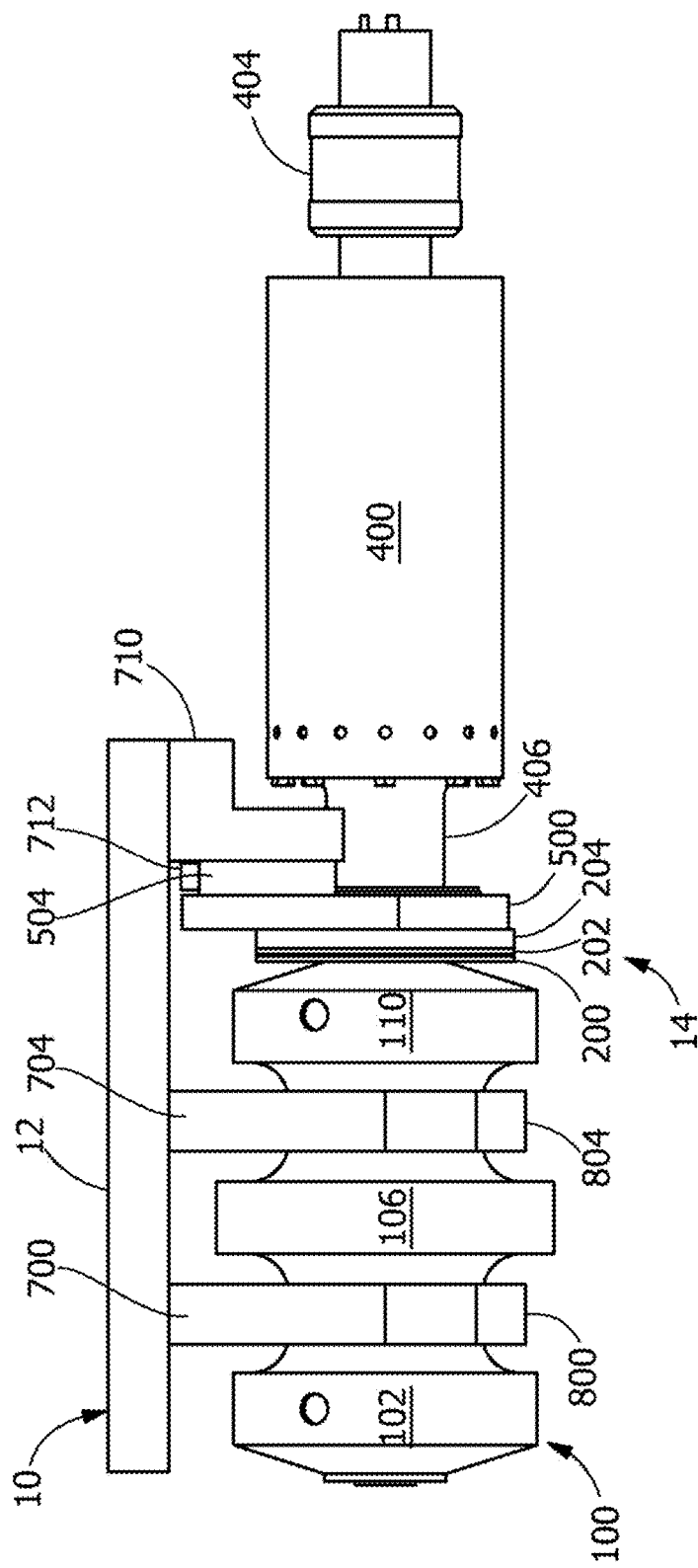
FIG. 4 is an assembled side view of the high-efficiency welding assembly of FIG. 1.

FIG. 1 provides an exploded perspective view of an example implementation of a high-efficiency welding assembly for use in ultrasonic additive manufacturing processes; FIG. 2 provides an exploded side view of the high-efficiency welding assembly of FIG. 1; FIG. 3 provides an assembled cross-sectional side view of the high-efficiency welding assembly of FIG. 1; and FIG. 4 provides an assembled side view of the high-efficiency welding assembly of FIG. 1. The example implementation shown in FIGS. 1-3 includes module mount or mounting plate 10, having a force application region 12 formed thereon where a press or the like is attached or connected for applying downward force to welding assembly 14. Full wave sonotrode 100 includes first body portion 102, first nodal region 104, textured welding surface 106, second nodal region 108 and second body portion 110. Spring clamp plate 200 is positioned adjacent to second body portion 110 and diaphragm spring 202 is connected to spring clamp plate 200. Diaphragm spring mount 204 is connected to diaphragm spring 202. Floating roller bearing 206 is connected to diaphragm spring mount 204 (by way of support ring 500, which acts as a housing by encircling and enclosing floating roller bearing 206 therein) and retaining ring 208 constrains diaphragm spring mount 204 within floating roller bearing 206. Bearing retention clips 210 constrain floating roller bearing 206 within support ring 500.

First transducer 400 includes brush mount 404 located on one end thereof and rotary electrical connector 406 located on the opposite end thereof. When welding assembly 14 is fully assembled, rotary electrical connector 406 passes through retaining ring 208, floating roller bearing 206, diaphragm spring mount 204 and support ring 500 and is connected to sonotrode 100 by first threaded stud 300. Transducer 400 is supported by support ring 500, to which first linear guide 504 and second linear guide 510 are mounted. First rail block 710, which includes first linear rail 712, is mounted to the bottom of mounting plate 10. Second rail block 720, which includes second linear rail 722, is also mounted to the bottom of mounting plate 10. When welding assembly 14 is fully assembled, first linear rail 712 engages first linear guide 504 in a sliding manner and second linear rail 722 engages second linear guide 510 in a sliding manner.

Connecting diaphragm spring 202 to support ring 500 permits sonotrode 100 to rotate. Connecting support ring 500 to linear guides 504 and 510 provides an additional degree of freedom for allowing welding assembly 14 to deflect under substantial loads. The disclosed floating diaphragm spring system allows an ultrasonic transmission line to be subjected to extremely high loads, and at the same time, allows the system to rotate at variable speeds and operate in a resonant mode with minimal power consumption. Previous UAM systems where limited to soft metals and plastic due to system limitations that prevented adequate forces from being applied to the workpiece.

As best shown in FIGS. 2-4, first bearing support housing 700 is connected directly to mounting plate 10 and houses first low friction bearing 702. Second bearing support housing 704 is also connected to mounting plate 10 and houses second low friction bearing 706. Support housings 700 and 704 distribute forces to the nodal regions of sonotrode 100. First low-friction bearing 702 is positioned directly over first nodal region 104 on sonotrode 100 and second low-friction bearing 706 is positioned directly over second nodal region 108 on sonotrode 100, both in a free state. First top bearing clamp 800 is connected to first bearing support housing 700 and houses third low friction bearing 802. Second top bearing clamp 804 is connected to second bearing support housing 704 and houses fourth low friction bearing 806.

Figure 5:
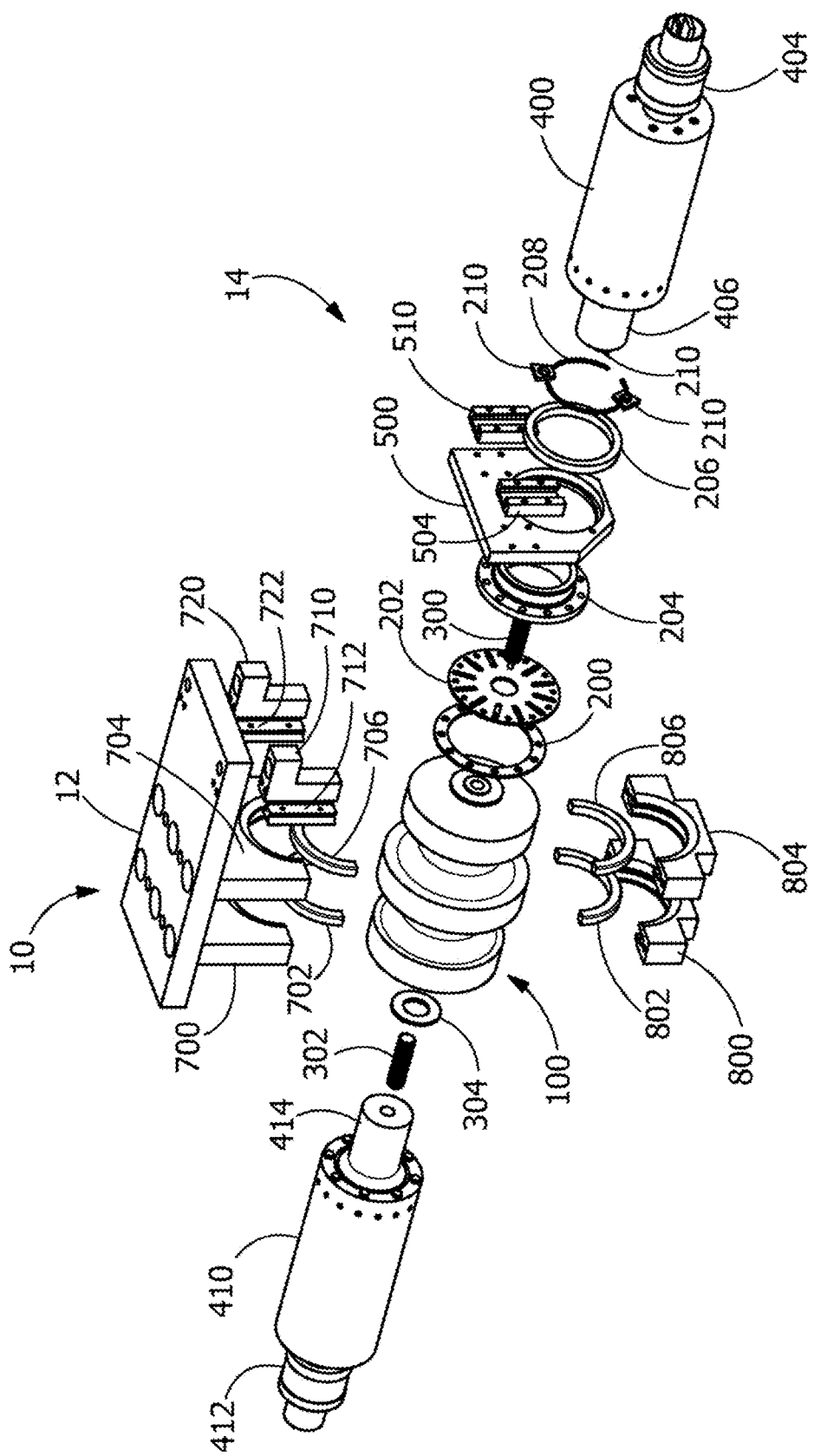
FIG. 5 is an exploded perspective view of a second example implementation of a high-efficiency welding assembly for use in ultrasonic additive manufacturing processes wherein a second transducer has been connected to the sonotrode.
Figure 6:
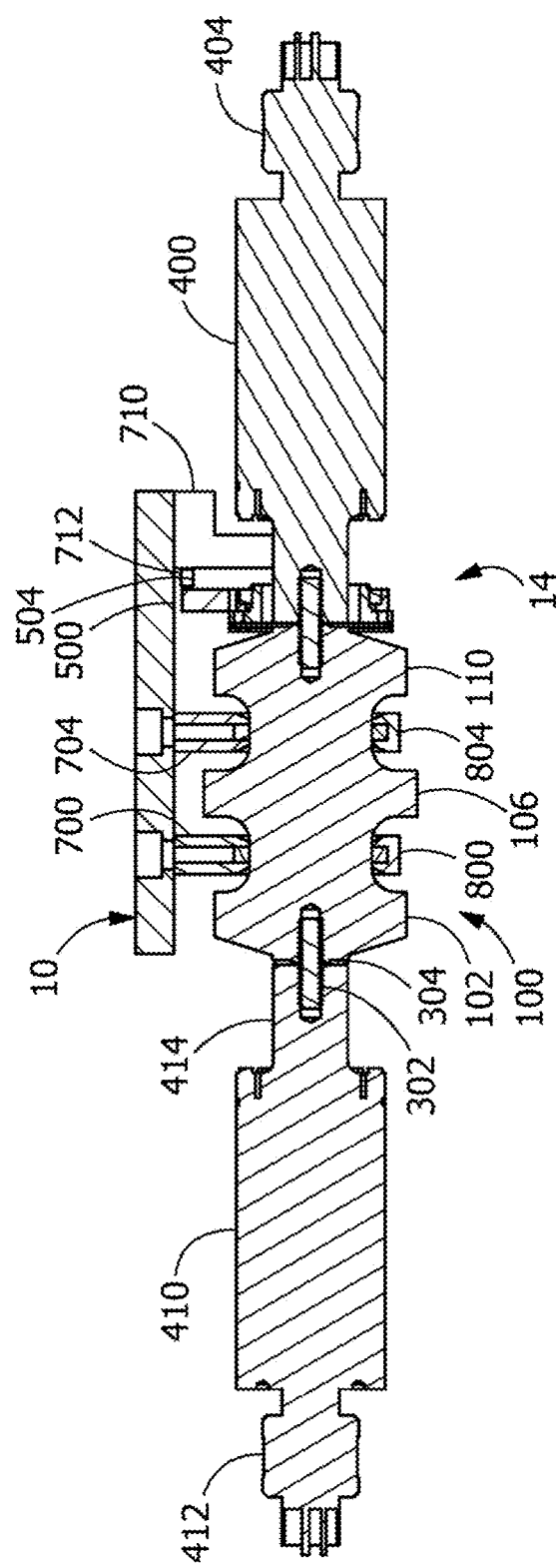
FIG. 6 is an assembled cross-sectional side view of the high-efficiency welding assembly of FIG. 5.
Figure 7:
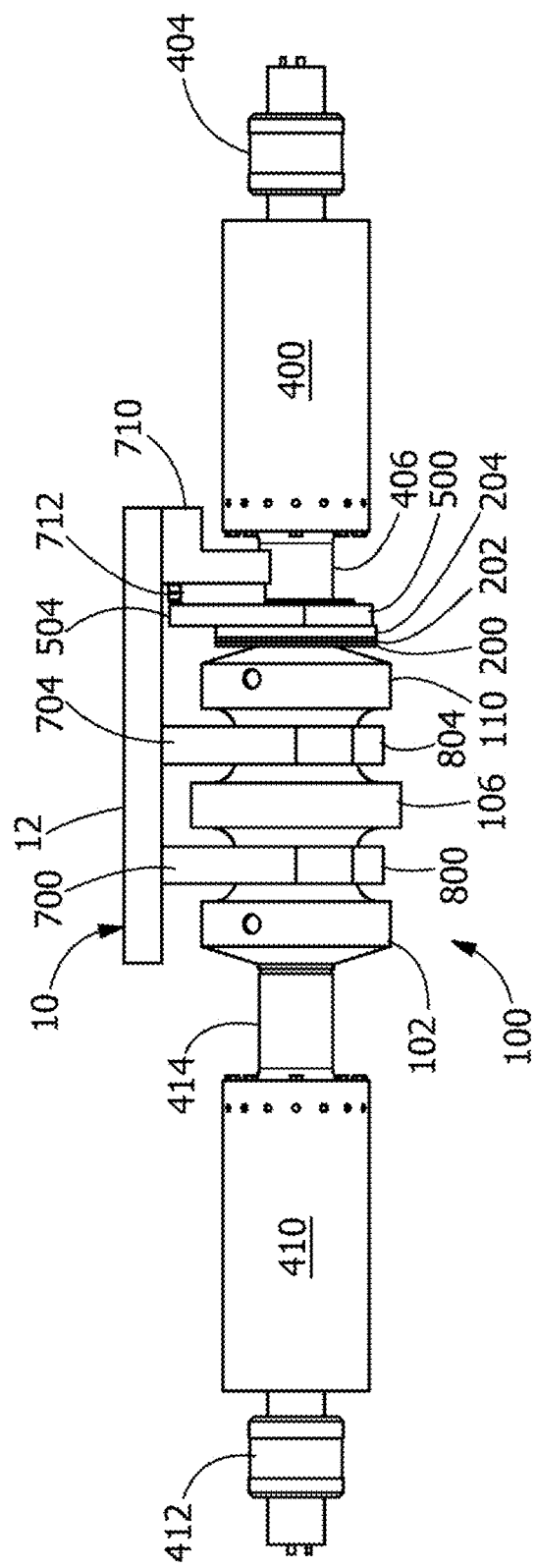
FIG. 7 is an assembled side view of the high-efficiency welding assembly of FIG. 5.

FIG. 5 provides an exploded perspective view of a second example implementation of a high-efficiency welding assembly for use in ultrasonic additive manufacturing processes wherein a second transducer has been connected to sonotrode 100; FIG. 6 provides an assembled cross-sectional side view of the high-efficiency welding assembly of FIG. 5; and FIG. 7 provides an assembled side view of the high-efficiency welding assembly of FIG. 5. In the example implementation shown in FIGS. 5-7, second transducer 410 includes brush mount 412 located on one end thereof and rotary electrical connector 414 located on the opposite end thereof. When welding assembly 14 is fully assembled, rotary electrical connector 414 passes through washer 304 and is connected to sonotrode 100 by second threaded stud 302.

Low-friction bearings 702, 706, 802, and 806 include various known specialty coatings, making them low-friction or reduced-friction in nature. Unlike more conventional systems that use diaphragm springs to support, locate, and apply force to the materials being welded, force is applied in this disclosed system through these low-friction bearings. These bearings, which may also be referred to as static bearings or force transmission bearings, permit transmission of ultrasonic vibrations while exerting high loads on materials while the materials are subjected to the rotary motion of sonotrode 100. This is particularly advantageous because while some prior art designs permit application of forces to the nodal position, they do not permit rotation, and in some cases require higher power levels to maintain resonance. Low-friction bearings 702, 706, 802, and 806 allow for the application of extremely high forces with an extremely low coefficient of friction, thereby permitting the entire stack to go into resonance at low power levels while also rotating. Upon the application of ultrasonic energy, vibrations are applied to the supporting regions which allows for smooth rotation due to the friction reduction phenomena associated with ultrasonic vibrations.

As shown in the Figures, the constraint of the welding horn (sonotrode 100) has been changed from the design used in systems such as that disclosed in U.S. Pat. No. 8,082,966. In previous welding assemblies, the welding horn floated on springs with parallel motion being achieved with linear bearings. This design permitted the horn to roll along its length causing the horn to contact the frictionless bearings at a single point as opposed to two contact points. The disclosed implementations include horns that are constrained by frictionless bearing saddles located on both the top and bottom of the horn face. Thus, when the horn is in use, four frictionless bearing lines are contacted rather than a single point, thereby greatly reducing wear on the frictionless bearings. A long period of operational use showed that springs, while effective, were difficult to assemble consistently, thereby requiring very tight tolerance on assembly shimming. The disclosed capping design also permits more repeatable and faster overall device assembly.

Disclosed implementations provide an advanced tool design that increases or enhances the performance of sonotrodes used in ultrasonic additive manufacturing (UAM) processes for metals, plastics, and textiles. More specifically, this technology provides more efficient energy transmission to a materials interface, thereby creating a superior weld and greatly increasing the strength of the final product. With regard to proper functioning of the present invention, two aspects of the described system are of particular importance with regard to achieving optimal performance of a very high power UAM welding module, i.e., allowing for movement of the anti-resonant regions while maintaining positional alignment.

First is the ability to transmit acoustical vibrations through a sonotrode as it is being subjected to extremely high loads. In the disclosed implementations, force is transmitted directly to the nodal region of the sonotrode closest to the working surface giving the least amount of deflection. "Low-friction" bearing coatings permit lower start-up power requirements for achieving system resonance. This coating material significantly reduces the contact friction between the tooling applying the force and sonotrode 100. This is an important aspect because the sonotrode should transmit vibrations which in turn create displacement. If these surfaces were fully constrained, more power would be required to put the system in motion. Sonotrodes that transmit longitudinal vibrations undergo natural lateral expansion and contraction arising from the Poisson effect (see "Introduction to High Power Ultrasonics, Graff, Chapter 2, section 2.2.4, FIG. 2.12). The present invention utilizes reduced friction bearing surfaces which require lower power to break free from static friction and makes use of radial vibrations caused by this expansion and contraction feature. This effect creates intermittent contact at the regions of force application. As a result, reduction of frictional forces at the bearing surfaces (or force applied regions) is achieved. As stated, the coated bearing surfaces apply high forces up to 200-lbs. (8000N). However, due to the specialty coatings (e.g., Frelon), the system requires minimal start up power to break free from the static friction at the interface. As the system goes into resonance, the Poisson effect generates an even higher friction reduction state since there is high frequency intermittent contact at the nodal region.

Second, a mounting mechanism in the form of a positional attachment device is provided to facilitate the proper functioning of the components described in the previous paragraph. Due to the forces exerted on sonotrode 100 during operation of the present invention, there will be inherent deflection in the system which must be considered to avoid the need for additional power to achieve resonance. In the exemplary embodiment, diaphragm spring 202 is connected to low friction/floating roller bearing 206, which is connected to linear guides 504 and 510, which permit deflection in the Z-axis (i.e., downward). In this manner, sonotrode 100 "floats" under high loads without damping acoustical vibrations. Since the system is permitted to float, or move where needed, the energy required to put the system in resonance is minimal, and output energy is more correctly distributed to the sonotrode's interface. This design permits operation at extremely high loads such as 2,000-lbs while transmitting high power vibrations in the order of 2 kW per transducer. The second function of diaphragm spring 202, acting in combination with linear guides 504, and 510, is to provide accurate and repeatable placement of the welding surface. Diaphragm spring 202 provides motion in the Z-axis. Moreover, the rigid constraint provided by low friction roller bearings 702, 706, 802, and 806 and linear guides 504 and 510 provide accurate positioning in both the X-axis and Y-axis. Thus, while linear guides 504 and 510 facilitate accurate positioning, roller bearing 206 allows for substantially continuous rotary motion. Furthermore, diaphragm spring 202 is not used to apply a load, but rather its inclusion allows for deflection of sonotrode 100 while exerting extremely high forces at welding surface 106. The disclosed system permits higher loads, e.g., increased from 400 to 2,000 pounds and ultrasonic energy levels increased from 1 kW to 9 kW are used to improve bonding and consolidation of deposited base materials. Additionally, the present invention provides preheating to soften the base materials to be bonded to allow bonding of higher-strength materials than would be feasible with prior art systems.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this specification are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted. For example, in one embodiment of this invention, unique sonotrode textures are used achieve enhanced transmission of the high vibration energy from the sonotrode to the base material to be welded. Other modifications are possible.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept.

What is claimed:

1. An ultrasonic welding system, comprising:
   (a) a 20-50 kHz welding assembly further comprising:
      (i) a rotating sonotrode, wherein the sonotrode further includes a first body portion, a first nodal region immediately adjacent to the first body portion, a welding region immediately adjacent to the first nodal region, a second nodal region immediately adjacent to the welding region, and a second body portion immediately adjacent to the second nodal region;
      (ii) a single transducer rotationally connected to the second body portion of the sonotrode for transmitting acoustic vibrations to the welding region;
      (iii) a mount, wherein the mount is configured to support the rotating sonotrode attached to the single transducer, and wherein the mount further includes first and second linear rails connected thereto;
      (iv) a roller device connected to the transducer and sonotrode for permitting axial rotation of the single transducer and sonotrode, wherein the roller device further includes a retaining ring, a floating roller bearing, a diaphragm spring mount, a diaphragm spring, and a spring clamp plate;
      (v) a support device flexibly connected to the roller device for maintaining axial alignment of the single transducer and sonotrode relative to a target welding area, wherein the support device further includes a support ring that houses the floating roller bearing, wherein the support ring includes first and second linear guides mounted thereon, and wherein the first and second linear guides flexibly engage the first and second linear rails connected to the mount;

(vi) a first frictionless bearing assembly positioned around the first nodal region of the sonotrode, wherein the first frictionless bearing assembly includes:
   a) an upper housing portion connected to the mount;
   b) a first frictionless bearing disposed within the upper housing portion, wherein the first frictionless bearing is in contact with the first nodal region of the sonotrode;
   c) a lower housing portion connected to the upper housing portion; and
   d) a second frictionless bearing disposed within the lower housing portion, wherein the second frictionless bearing is in contact with the first nodal region of the sonotrode; and
(vii) a second frictionless bearing assembly positioned around the second nodal region of the sonotrode, wherein the second frictionless bearing assembly includes:
   a) an upper housing portion connected to the mount;
   b) a third frictionless bearing disposed within the upper housing portion, wherein the third frictionless bearing is in contact with the second nodal region of the sonotrode;
   c) a lower housing portion connected to the upper housing portion; and
   d) a fourth frictionless bearing disposed within the lower housing portion, wherein the fourth frictionless bearing is in contact with the second nodal region of the sonotrode.

2. The ultrasonic welding system of claim 1, wherein the mount further includes a force application region.

3. The ultrasonic welding system of claim 1, wherein the transducer and sonotrode rotate axially in unison.

4. The ultrasonic welding system of claim 1, further comprising a threaded connector for connecting the transducer to the sonotrode.

5. The ultrasonic welding system of claim 1, wherein the welding region of the sonotrode is textured.

\* \* \* \* \*